United States Patent Office 3,416,990
Patented Dec. 17, 1968

3,416,990
GLASS FIBER-REINFORCED POLYMERS
Anderson E. Robinson, Jr., Wilmington, Del., assignor to Hercules Incorporated, a corporation of Delaware
No Drawing. Filed Aug. 6, 1965, Ser. No. 477,922
20 Claims. (Cl. 161—93)

This invention relates to the preparation of molding compositions comprising a thermoplastic polymer reinforced with glass fiber or fabric.

Synthetic plastic materials reinformed with glass fiber are already well known to the art. Such materials find much use in rocket engine casings, small boat hulls, automobile bodies, fishing poles, archery bows, and many other diverse products. Items prepared from such material are characterized by a very high ratio of strength to weight due to the synergistic combination of glass and plastic.

In the past, most, if not all, of the glass reinforced plastics have been thermosetting, the polymers employed being principally epoxy or polyester-styrene type resins. Fabrication of such materials involved impregnating a glass fabric in a mold with the uncured polymer, shaping it in the mold and maintaining the mass under pressure at a proper curing temperature until the polymer cured to form a self sustaining shaped structure. Once cured, the thermoset material is extremely strong and form stable. In fact, its form stability is such that the material cannot be reshaped.

The thermosetting character of the resins used in the prior art procedures represents a disadvantage which greatly detracts from the otherwise excellent and desirable qualities of the prior art reinforced plastics. Because of this thermosetting characteristic, the polymer must be prepared in situ by the fabricator of the desired item, who must accordingly stock all of the materials and mix the same at the time of fabrication. In addition, the time spent waiting for the polymer to cure makes for an undesirably long and, hence, expensive molding cycle.

In the past, most attempts to overcome, in part, the disadvantages associated with the use of thermosetting resins by using thermoplastic resins have met with failure due to the difficulties encountered in effecting good bonding between the glass and the thermoplastic material. The lack of good bonding results in structures having lower tensile strength than that exhibited by the glass-reinforced thermosetting plastic. This is particularly true of the solid propylene polymers, whose unique combination of properties such as low density, high strength, chemical inertness, and durability makes them very attractive candidates for molding applications generally, but whose lack of adhesion to glass has to date ruled out their use in glass reinforced form.

The present invention is based on the discovery that propylene polymers that have been modified by reaction with a small amount of a derivative of an ethylenically unsaturated polycarboxylic acid possess remarkable adhesion to glass fibers and to unmodified propylene polymers.

In accordance with the instant invention, there are provided glass fiber-reinforced propylene polymer compositions exhibiting high glass to polymer adhesion and high strength. These compositions comprise, based on the total weight of the composition, about 1 to 90%, of a glass fiber phase, and about 10 to 99% of a solid propylene polymer phase, at least part of which comprises a proylene polymer which has been modified by chemical reaction with an ethylenically unsaturated polycarboxylic acid or a derivative of such an acid. The modified propylene polymer must comprise at least about 0.2% of the total propylene polymer phase, though it may comprise the entire propylene polymer phase. It will normally be about 0.2 to 25% of the propylene polymer phase or about 0.02 to 24.75% of the total composition. Thus, the compositions of the invention can comprise about 1 to 99% glass fibers, about 0 to 98.98% unmodified propylene polymer and about 0.02 to 99% modified propylene polymer, with the preferred compositions being about 1 to 90% glass fibers, about 74.25 to 98.98% unmodified propylene polymer and about 0.02 to 24.75% modified propylene polymer.

The compositions of this invention represent a distinct improvement over the glass-reinforced polypropylene compositions previously known to the art. The items formed from the compositions of the instant invention are characterized by flexural strength substantially higher than those of glass-reinforced propylene polymer which has not been modified as in the invention.

The acid-modified propylene polymer of the instant invention can be any solid polymer of propylene or copolymer thereof with another 1-olefin. Homopolymers of propylene exist in both amorphous and crystalline form (the latter sometimes called isotactic or stereoregular polypropylene). Either of these homopolymers of propylene can be modified for use in this invention. Likewise propylene can be copolymerized with ethylene and/or another 1-olefin to yield amorphous or crystalline copolymers. Typical copolymers in addition to that prepared with ethylene are those prepared with butene-1 and the terpolymer prepared from propylene, ethylene and a diene such as dicyclopentadiene. Any of these can likewise be used.

The modification of the polymer is effected with an ethylenically substituted polycarboxylic acid or an anhydride, amide or lower alkyl ester thereof which has its ethylenic unsaturation on a C atom in a position alpha to at least one carboxyl group or potential carboxyl group. The preferred modifiers are the derivatives of unsaturated dicarboxylic acids having four carbon atoms in the longest straight chain beginning and ending with a carboxyl group or potential carboxyl group. Examples of such acid derivatives include maleic acid, itaconic acid, citraconic acid, mesaconic acid, maleic anhydride, citraconic anhydride, itaconic anhydride, maleamic acid, maleimide, maleamide, conate, monomethyl maleate, dipropyl citraconate, di and esters of such acids wherein the alcohol moiety has 1 to 18 C atoms such as diethyl maleate, dimethyl itamethyl fumarate, monoethyl citraconate, and the like. The most preferred modifier is maleic anhydride.

The acid-modified polymers are prepared by treating the propylene polymer to produce on the polymer chain active sites at which the modifying compound can anchor through its double bond. Such active centers can readily be induced in known ways as, for example, by subjecting the polymer to the action of high energy ionizing radiations such as gamma rays, X-rays, or high speed electrons, or by contacting the polymer, either as a solid or dissolved in a solvent, with a free radical producing material such as peroxide. Preferably, the modified propylene polymer is prepared by reacting the unsaturated polycarboxylic acid or derivative thereof with a solution of the polymer in an organic solvent containing a free radical producing material, such method being described in Belgian Patent No. 607,269.

The acid-modified polymers of this invention contain the unsaturated acid derivative in a quantity sufficient to provide about 0.15 to 5.0, preferably about 0.4 to 3.5% actual or potential carboxyl group by weight of the modified polymer. As an example of calculating the weight percent of actual or potential carboxyl groups present in the modified polymer, the addition of 1 part maleic anhydride to 99 parts of base polymer is calculated to result in a modified polymer containing 0.908% potential carboxyl groups, as follows:

$$1\% \times \frac{90 \text{ (molecular weight of 2 COOH groups)}}{98 \text{ (molecular weight of maleic anhydride)}} = 0.908$$

The modified propylene polymer should have a reduced specific viscosity of about 0.5 to 5. More preferably this should be about 0.8 to 3.5. Optimal viscosity levels within these ranges are easily determined for a specific polymer by experimentation.

When the propylene polymer phase of the composition is to contain unmodified as well as modified polymer, any of the above-named types of polymers or copolymers can be employed. The most frequently used unmodified propylene polymers are the crystalline homopolymer and crystalline copolymer of propylene, especially those copolymers known as "block copolymers" which are made from propylene and up to about 20 mole percent of another 1-olefin, such as ethylene. These crystalline homopolymers and copolymers will henceforth be generically termed "crystalline polypropylene" for the sake of brevity.

The actual practice of the invention can be accomplished according to several alternative embodiments. For example, the glass fiber can be in the form of a woven or nonwoven fabric which is compressed into a laminated structure with a propylene polymer. In this case a preferred embodiment of the invention is to treat the fabric by applying a coating thereto of the modified propylene polymer and then plying the fabric with films of unmodified polymer. Alternatively, an untreated glass fabric can be plied with films of modified propylene polymer. It is also possible to ply the fabric with films comprised of a blend of unmodified and modified propylene polymer. All of the polymers of propylene, either amorphous or crystalline, mentioned previously can be used in this embodiment for either the modified or unmodified polymer phase. The choice of polymer is governed by the properties desired in the finished product. In any of these variations, the presence of the organic acid derivative enables the polymer phase to bond securely to the glass and form a strongly reinforced laminated structure. When the polymer phase contains both modified and unmodified propylene polymer, the modified polymer likewise provides a bond to the unmodified polymer. Such laminated structures are very useful in, e.g., thermoforming techniques where a sheet is clamped in a mold, heated to soften it and then drawn by vacuum or blown to conform to the shape of the mold.

In another embodiment of the invention, the glass fibers can be in the form of individual short length fibers or small patches of glass fiber mat which are blended with propylene polymer to form a molding powder. Here again, the same alternative methods of contacting the glass fibers with the modified propylene polymer are available—that is, the modified polymer can be coated on the glass fiber prior to forming the molding powder or the modified polymer can be used as all or part of the molding powder matrix. Thus, the matrix can be either modified propylene polymer exclusively or a blend of modified polymer with unmodified polymer. An attractive alternative of this embodiment comprises impregnating a glass roving with propylene polymer and thereafter reducing the roving to molding pellet size. Either the glass roving can be initially coated with the modified polymer and then impregnated with unmodified polymer or the modified polymer can be included within the polymer matrix and applied simultaneously therewith. The glass roving is also useful, without being reduced to pellet size, in filament winding applications to produce pipes, storage tanks, pressure vessels, and the like.

Molding powder thus prepared can be used as if for ordinary compression molding of reinforced objects or it can be melted in an extruder and used for injection molding. For greater ease of handling in subsequent molding operations, it is frequently desirable to extrude the powder to form pellets therefrom.

When the modified polymer is applied directly to the glass fibers, the method of doing so is a matter of choice with the practitioner. A preferred method is to apply it from a solution in an inert organic solvent, using conventional solution coating techniques such as spraying, brushing, dipcoating, etc. The acid-modified amorphous polymers are readily soluble at room temperature in a number of common solvents such as hydrocarbons and chlorinated hydrocarbons, for example aliphatic hydrocarbons such as hexane, decane, undecane, and the like; aromatic hydrocarbons such as xylene, cumene, p-cymene, toluene, and the like; and chlorinated hydrocarbons such as chlorobenzene, chlorotoluene, methyl chloride, carbon tetrachloride, and the like; and cycloaliphatic hydrocarbons such as cyclohexane. In general, such solutions will contain about 1% to 20% by weight of the modified polymer, depending upon the viscosity of the polymer being used and the thickness of the coating desired.

Modified crystalline polypropylene can likewise be applied from solution using similar techniques, if elevated temperatures are employed. Crystalline polypropylene is normally soluble in the same solvents as are the amorphous polymers, but requires temperatures of about 120° C. or higher. Thus, any of the above-named solvents which remain liquid at solution temperatures can be used.

Another preferred method of application of the modified polymers to the glass is from a suspension in a diluent inert at room temperature, followed by baking to fuse the polymer particles into a continuous coating. The diluent can be either an inert organic liquid in which the polymer is insoluble under the conditions of application, or it can be water. If the fibers are to be added to the propylene polymer and molded relatively soon after application of the modified polymer thereto, the baking of the modified polymer on the glass can be preformed as part of the molding operation.

Regardless of the application method employed, it is preferred to apply the modified polymer in amount equal to at least about 0.1% by weight based on the weight of the glass fiber.

The following examples are presented to illustrate the improvement in flexural strength and modulus of glass fiber-reinforced polymer compositions according to this invention. Parts and percentages are by weight in all cases.

Examples 1–6

Standard commercially woven fabrics of heat-treated glass fiber were coated with maleic anhydride modified crystalline polypropylene containing respectively 0.4, 0.9, 1.9 and 3.3% combined maleic anhydride. Coating was accomplished by immersing the fabric for about 2 hours in a solution at 120° C. of about 1% by weight of the maleic anhydride modified polypropylene in a petroleum fraction boiling in the range between 140 and 200° C. and thereafter extracting twice with hot solvent, to remove residual modified polymer, and drying.

The treated fabrics were made into laminates by preparing a sandwich of 13 plies of 6-mil unmodified polypropylene film alternated with 12 plies of the treated glass. These laminates were molded in a picture frame mold with a chrome-plated backing plate by heating for 3 minutes at 235° F. at contact pressure followed by 3 minutes at 235 F. under 500 p.s.i. pressure and thereafter cooling to 20° C. under 500 p.s.i. pressure. The resulting laminates were ⅛ inch thick. A corresponding ⅛-inch sheet of unreinforced polypropylene was simultaneously prepared as a control.

Test specimens measuring 1 x 3 x ⅛ inch were cut from the laminates and tested for flexural properties as outlined in ASTM standard test D790, using a crosshead speed of 0.2 in./min. Flexural strength and modulus of the specimens are recorded in Table I.

TABLE I

| Example No. | Glass treatment | Percent maleic anhydride | Polymer | Percent polymer | Strength (p.s.i.) | Modulus÷10⁶ (p.s.i.) |
|---|---|---|---|---|---|---|
| Control | | | (¹) | (¹) | 8,200 | 0.53 |
| 1 | None | | Stereoregular polypropylene | 28.0 | 13,260 | 1.72 |
| 2 | do | 0.65 | Maleic anhydride modified crystalline polypropylene. | 30.0 | 34,800 | 2.59 |
| 3 | 0.8% Maleic anhydride modified crystalline polypropylene. | 0.4 | Stereoregular polypropylene | 28.9 | 26,080 | 1.99 |
| 4 | 0.5% Maleic anhydride modified crystalline polypropylene. | 0.9 | do | 27.7 | 31,970 | 2.19 |
| 5 | 0.9% Maleic anhydride modified crystalline polypropylene. | 1.9 | do | 27.8 | 33,100 | 2.05 |
| 6 | 0.7% Maleic anhydride modified crystalline polypropylene. | 3.3 | do | 28.5 | 33,270 | 2.34 |

¹ Unreinforced stereoregular polypropylene (⅛ inch).

Examples 7–10

Laminates of glass fabric with stereoregular polypropylene were prepared wherein the glass fabric was first primed with various propylene polymers modified with itaconic acid. Application of the prime coating to the glass and lamination of the glass with the stereoregular polypropylene were accomplished in substantially the manner described for Examples 1–6.

Test specimens measuring 1 x 3 x ⅛ inch were cut from the laminates and tested for flexural properties following the procedure of ASTM D790 using a crosshead speed of 0.2 in./min.

The data relating to these laminates and their properties are recorded in Table II. The improved properties of these laminates are clearly seen by comparison with the data shown in Table I for the unreinforced control and for the stereoregular polypropylene reinforced with unprimed glass.

TABLE II

| Example No. | Glass treatment | Percent acid | Percent polymer | Strength (p.s.i.) | Modulus÷10⁶ (p.s.i.) |
|---|---|---|---|---|---|
| 7 | 0.9% Itaconic acid modified crystalline polypropylene. | 0.9 | 30.1 | 30,750 | 2.15 |
| 8 | do | 1.9 | 29.7 | 32,700 | 2.30 |
| 9 | 0.9% Itaconic acid modified atactic polypropylene. | 1.9 | 29.4 | 31,500 | 2.07 |
| 10 | 0.9% Itaconic acid modified amorphous copolymer of 57% ethylene and 43% propylene. | 1.9 | 29.4 | 31,200 | 2.11 |

It is also within the contemplation of the invention that polymers of olefins other than propylene, for instance polymers of ethylene, styrene or butene-1, can comprise all or part of the polymeric matrix of the composition of the invention. For example, glass fibers can be coated with a propylene polymer that has been modified by reaction with the previously specified unsaturated dicarboxylic acids or derivatives and the thus-coated fibers can be used as a filler for polyethylene. Likewise, glass fabric which has been coated with the modified propylene polymer can be laminated with layers of polyethylene film, as is illustrated in the following examples.

Examples 11–12

Heat-treated glass fabric was coated with maleic anhydried modified crystalline polypropylene containing about 3.4% maleic anhydride. The coating was equivalent to about 0.5% by weight based on the weight of the fabric. The coated fabric was then laminated with 6-mil polyethylene film. Lamination was accomplished by interspering 12 layers of treated glass with 11 layers of film, heating at contact pressure for 3 minutes at 180° C., thereafter compressing to ⅛ inch thickness and heating for 3 minutes at 180° C. at about 500 p.s.i. pressure. The flexural strength and modulus of a laminate prepared in this way were 25,000 and $2.7 \times 10^6$ p.s.i., respectively.

A similar laminate of polyethylene film and glass fabric which was not primed with the modified propylene polymer exhibited flexural strength and modulus of 11,900 and $1.47 \times 10^6$ p.s.i., respectively.

As the data clearly show, both flexural strength and modulus are dramatically improved by the presence of the modified propylene polymer. The higher strength and modulus of the modified polymer compositions indicate a very strong bond between the glass and the polymer, whereby the strength of the glass is more efficiently utilized than is the case with unmodified polymer.

The compositions of the invention can be used in any of the applications where thermoplastic polymers are currently employed and where greater strength is required than that exhibited by unreinforced polymers.

What I claim and desire to protect by Letters Patent is:

1. A glass reinforced thermoplastic molding composition comprising about 1 to 90% glass fibers and about 99 to 10% of a polymer of propylene at least part of which has been chemically modified by reaction with an ethylenically unsaturated compound selected from the class consisting of dicarboxylic acids and anhydrides, amides, and esters thereof wherein the alcohol moiety of said esters contains 1 to 18 carbon atoms and which has its unsaturation in a position alpha to a carboxyl group or potential carboxyl group, said modified polypropylene containing about 0.15 to 5% actual or potential carboxyl groups.

2. A composition according to claim 1 wherein the ethylenically unsaturated compounds has 4 carbon atoms in its longest carbon chain beginning and ending with a carboxyl group.

3. The composition of claim 2 where the propylene polymer is selected form the group consisting of amorphous polypropylene, crystalline polypropylene, amorphous and crystalline copolymers of propylene and another 1-olefin, and amorphous copolymers of propylene, another 1-olefin and a diene.

4. The composition of claim 2 where the glass fiber is in fabric form.

5. The composition of claim 2 where the ethylenically unsaturated compound is maleic anhydride.

6. A glass reinforced thermoplastic molding composition comprising about 1 to 90% glass fibers, based on total weight of the composition, about 0 to 98% unmodified crystalline polypropylene, and about 0.02 to 99% crystalline polypropylene modified by chemical reaction with about 0.15 to 5% maleic anhydride.

7. A glass reinforced thermoplastic molding composition comprising about 1 to 90%, based on the total weight of the composition, of glass fibers, about 0 to 98% unmodified crystalline polypropylene, about 0.02 to 99% of amorphous polypropylene modified by chemical reaction with about 0.15 to 5% maleic anhydride.

8. A glass fiber reinforced thermoplastic molding composition comprising about 1 to 90% based on the total weight of the composition of glass fibers, about 0 to 98% crystalline polypropylene and about 0.02 to 99% of an amorphous copolymer of ethylene and propylene modified by chemical reaction with about 0.15 to 5% maleic anhydride.

9. A glass fiber reinforced thermoplastic composition comprising glass fibers coated with crystalline polypropylene modified by chemical reaction with about 0.15 to 5% maleic anhydried nad embedded in a matrix of crystalline polypropylene.

10. A glass fiber reinforced thermoplastic composition comprising glass fibers embedded in a matrix comprised of crystalline polypropylene containing about 0.02 to 100% of crystalline polypropylene modified by chemical reaction with about 0.15 to 5% maleic anhydride.

11. A glass fiber reinforced plastic composition comprising glass fibers coated with amorphous polypropylene modified by chemical reaction with about 0.15 to 5% maleic anhydride embedded in a matrix of crystalline polypropylene.

12. A glass fiber reinforced thermoplastic composition comprising glass fibers embedded in a matrix of crystalline polypropylene modified by chemical reaction with about 0.15 to 5% maleic anhydride.

13. A laminate comprising layers of glass fabric laminated in a matrix of crystalline polypropylene modified by chemical reaction with about 0.15 to 5% maleic anhydride.

14. A laminate comprising layers of glass fabric laminated in a matrix of crystalline polypropylene containing about 0.02 to 100% of crystalline polypropylene modified by chemical reaction with about 0.15 to 5% maleic anhydride.

15. A laminate comprising layers of glass fabric coated with crystalline polypropylene modified by chemical reaction with about 0.15 to 5% maleic anhydride and embedded in a matrix of crystalline polypropylene.

16. A laminate comprising glass fabric coated with amorphous polypropylene modified by chemical reaction with about 0.15 to 5% maleic anhydride and embedded in a matrix of crystalline polypropylene.

17. A laminate comprising layers of glass fabric embedded in a matrix of crystalline polypropylene and amorphous polypropylene modified by chemical reaction with about 0.15 to 5% maleic anhydride.

18. Glass fibers coated with crystalline polypropylene modified by chemical recation with about 0.15 to 5% maleic anhydride.

19. Glass fibers coated with amorphous polypropylene modified by chemical reaction with about 0.15 to 5% maleic anhydride.

20. A glass reinforced thermoplastic molding composition comprising about 1 to 90% glass fibers, based on total weight of the composition, about 0 to 98% polyethylene, and about 0.02 to 99% crystalline polypropylene modified by chemical reaction with about 0.15 to 5% maleic anhydride.

References Cited
UNITED STATES PATENTS 3,264,156   8/1966   Vanderbilt et al. ____ 161—203
3,290,415   12/1966   Tanner _____ 260—878

ROBERT F. BURNETT, *Primary Examiner.*

W. J. VAN BALEN, *Assistant Examiner.*

U.S. Cl. X.R.

161—98, 156, 162, 164, 166, 203; 260—41, 878; 156—334; 117—126